United States Patent Office 3,313,810
Patented Apr. 11, 1967

3,313,810
PHENOTHIAZINE DERIVATIVES
Michio Nakanishi and Chiaki Tashiro, Nakatsu, Japan, assignors to Yoshitomi Pharmaceutical Industries, Ltd., Osaka, Japan
No Drawing. Filed Nov. 12, 1963, Ser. No. 323,104
Claims priority, application Japan, Nov. 15, 1962, 37/51,393, 37/51,394
22 Claims. (Cl. 260—243)

This invention relates to novel phenothiazine derivatives.

The phenothiazine derivatives of this invention are represented by the following general formula:

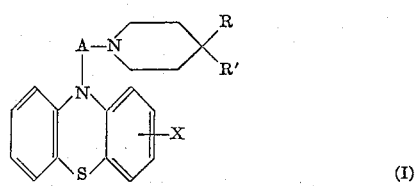

wherein X represents a hydrogen atom, halogen atom, alkyl group, alkoxy group, alkylthio group, acyl group or polyhalogeno alkyl group; A represents an alkylene group; R represents a hydrogen atom, carbamoyl group, phenyl group, or phenyl substituted with halogen, alkyl group or polyhalogeno alkyl group; R' represents the

group (in which each of Q and Q' represents an alkyl group, or Q and Q' together with the adjacent nitrogen atom collectively represent a heterocyclic group), when R represents a hydrogen or carbamoyl group; and R' represents a hydroxy group, nitrile group, a group easily derived from the nitrile group, alkoxy group, acylaminomethyl group or

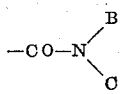

(in which each of B and C represents a hydrogen atom, lower alkyl group, or B and C together with the adjacent nitrogen atom collectively represent a pyrrolidino group or piperidino group), when R represents a substituted or unsubstituted phenyl group.

The phenothiazine derivatives of the general Formula I may be produced, according to this invention, by reacting a compound of the formula:

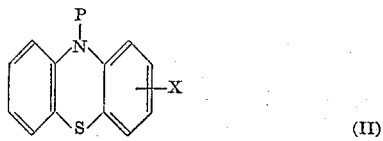

with a compound of the formula:

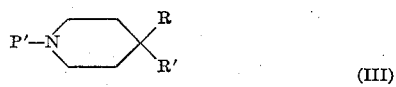

and, if desired and when R' is a nitrile group, by converting the nitrile group to a group which can readily be derived from the nitrile group. In the above formulae, either one of P and P' represents an —A—Y group (in which Y is a halogen atom or organic sulfonyloxy group, and A is as defined before) and the other represents a hydrogen atom, and X, R and R' are as defined before.

In the above Formulae I, II and III, X represents a hydrogen atom, halogen atom, alkyl group, alkoxy group, alkylthio group, acyl group or polyhalogenoalkyl group. The halogen atom may be fluorine, chlorine, bromine or iodine. The alkyl group may be of straight chain, branched or cyclic, typical examples being methyl, ethyl, propyl, isopropyl, butyl, pentyl, cyclohexyl, etc. Examples of the alkoxy group are methoxy, ethoxy, propoxy, isopropoxy groups, etc. Examples of the alkylthio group are methylthio, ethylthio, propylthio, isopropylthio, butylthio, etc. groups. Typical examples of the acyl groups are acetyl, propionyl, isobutyryl, benzoyl, etc. groups. Among polyhalogenoalkyl groups designated by X are, for example, trifluoromethyl, etc. groups.

The alkylene groups represented by A may be of straight chain or branched, and examples thereof are ethylene, propylene, isopropylene, isobutylene, pentamethylene, hexamethylene, etc.

As mentioned before R in the Formulae I and III represents a hydrogen atom, carbamoyl group, phenyl group, or phenyl substituted with halogen, alkyl group or polyhalogenoalkyl group. Examples of these halogen, alkyl groups and polyhalogenoalkyl groups may be the same as those given above for X.

When R is hydrogen or carbamoyl group, R' in the Formulae I and III represents

group in which each of Q and Q' represents an alkyl group (e.g., methyl, ethyl, propyl, isopropyl, butyl, pentyl, cyclohexyl, etc.) or Q and Q' together with the adjacent nitrogen atom forms a heterocyclic group, e.g., pyrrolidino, piperidino, morpholino group.

When R is a substituted or unsubstituted phenyl group, R' in the Formulae I and III represents a hydroxy group, nitrile group, a group easily derived from nitrile group, alkoxy group (e.g., methoxy, ethoxy, propoxy, etc.), acylaminomethyl group (e.g., acetylaminomethyl, propionylaminomethyl, butyrylaminomethyl, benzoylaminomethyl, etc.) or

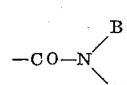

group in which each of B and C represents a hydrogen atom or lower alkyl group (e.g. methyl, ethyl, propyl, etc.), or B and C together with the adjacent nitrogen atom form a pyrrolidino group of piperidino group. Examples of the group readily derived from nitrile group are aminomethyl, acylaminomethyl (e.g., acetylaminomethyl, propionyl aminomethyl, butyrylaminomethyl, benzoylaminomethyl, etc.), amidino, alkoxy, carbonyl (e.g., methoxy carbonyl, ethoxy carbonyl, propoxy carbonyl, etc.), carboxyl, carbamoyl, etc.

In the Formulae II and III, either one of P and P' represents a hydrogen atom, while the other represents an —A—Y group wherein A is as defined before and Y is a halogen atom (i.e., fluorine, chlorine, bromine, iodine) or an organic sulfonyloxy group such as methane sulfonyloxy, benzene sulfonyloxy, tosyl (toluene sulfonyloxy), etc. group.

The reaction between the compound of Formula II and the compound of Formula III to form the compound of Formula I may be conducted in the absence of any solvent, but it is preferable to carry out the reaction in a solvent. The solvent may vary over a wide range provided that it does not adversely affect the desired reaction. The solvent may be suitably selected depending upon the particular materials, reaction conditions, etc. Among solvents which may be used are alcohols such as methanol, ethanol, propanol, isopropanol, butanol, isobutanol, etc., ketones such as acetone, methyl ethyl ketone, cyclohexanone, etc., aromatic hydrocarbons such as benzene, toluene, xylene, etc., halogenated hydrocarbons such as chlorobenzene, etc., tetrahydrofuran, dioxane, pyridine, aqueous ammonia, etc.

The other reaction conditions are also not critical. Thus, the reaction may be carried out at a normal temperature or even under cooling if desired. However, in most cases, it is preferable to employ a solvent and to conduct the reaction under heating at a temperature up to the boiling point of the solvent. The reaction should be continued until the desired yield of the compound of the Formula I is obtained.

If desired, the reaction may be conducted in the presence of a deacidifying agent or condensation agent such as alkali hydroxide (e.g. sodium hydroxide, potassium hydroxide, etc.), alkali carbonate (e.g. sodium carbonate, potassium carbonate), tertiary amine (e.g. pyridine, triethyl amine, etc.).

If the substituent R' in the Formula III is nitrile group, the resulting reaction product of the Formula I wherein R' is the nitrile group may be further treated in a known manner to convert the nitrile group into any other group such as aminomethyl group, acylaminomethyl group, amidino group, alkoxycarbonyl group, carboxyl group, carbamoyl group, etc.

The phenothiazine derivatives in the form of base thus obtained may be converted to salts, such as inorganic acid salts (e.g. hydrochloride, nitrate, sulfate, etc.), organic acid salts (e.g. oxalate, maleate, fumarate, tartrate, citrate, etc.) or quaternary ammonium salts (e.g. addition of iodomethylate, iodoethylate, methyl sulfate, etc.). They may also be purified in a conventional manner such as distillation, column chromatography, acid and alkali treatment, recrystallization, etc.

The novel phenothiazine derivatives of the present invention are useful as therapeutic agents acting on the central nervous system.

The following examples illustrate, by way of exemplification and not for limitation, the invention.

Example 1

A mixture of 5 grams of 3-(3-chloro-10-phenothiazinyl)propyl tosylate, 2.5 grams of 4-pyrrolidinopiperidine, 5 grams of sodium carbonate and 5 milliliters of alcohol is heated under reflux for 8 hours. After cooling, the reaction mixture is filtered, and to the filtrate is added maleic acid to precipitate the maleate of 3-chloro - 10 - {3-(4-pyrrolidinopiperidino) - propyl}phenothiazine. The maleate, after recrystallization from methanol, melts at 207° C. The maleate is converted to the free base by treatment with 10% sodium hydroxide, and the free base is treated with hydrogen chloride in ether to yield a crystalline dihydrochloride, which melts at 287° C.

Example 2

Proceeding in the same manner as in Example 1, but employing 4-piperidinopiperidine instead of 4-pyrrolidinopiperidine, there is obtained 3-chloro-10-{3-(4-piperidinopiperidino)-propyl}phenothiazine dimaleate, which melts at 217° C.

Example 3

10 grams of 3-chlorophenothiazine is subjected to reaction with sodium amide, prepared from 1.1 grams of metallic sodium, in liquid ammonia. Then the ammonia is replaced by xylene, and to the xylene solution is added 10 grams of N-(3-chloropropyl)-4-pyrrolidinopiperidine at 130–140° C. in the course of 1 hour. Then the mixture is maintained at the same temperature for further 1 hour. After cooling, the reaction mixture is filtered, washed with water, dried over potassium carbonate, and xylene is distilled off. The oily residue is dissolved in methanol, and to the solution is added maleic acid to yield crystalline dimaleate of 3-chloro-10-{3-(4-pyrrolidinopiperidino)propyl}phenothiazine, which melts at 207° C.

Example 4

Proceeding in the same manner as in Example 3, but employing 10.5 grams of N-(3-chloropropyl)-4-piperidinopiperidine instead of N-(3-chloropropyl)-4-pyrrolidinopiperidine, there is obtained crystalline dimaleate of 3-chloro - 10-{3 - (4-piperidinopiperidino)propyl}phenothiazine, which melts at 217° C.

Example 5

A mixture of 5 grams of 3-chloro-10-(3-bromopropyl)-phenothiazine, 3 grams of 4-piperidino-4-carbamoylpiperidine, 3 grams of potassium carbonate, 0.2 gram of copper powder and 60 milliliters of benzene is heated under reflux for 40 hours. The reaction mixture is filtered, treated with activated charcoal, hydrogen chloride is passed through the benzene solution, and the precipitate formed is collected by filtration and washed with alcohol. There is obtained, after recrystallization of the precipitate from methanol, dihydrochloride of 3-chloro-10-{3-(4-piperidino - 4-carbamoylpiperidino)propyl}phenothiazine, which carries one molecular methanol of crystallization and melts at 263–264° C.

*Elementary analysis.*—Calculated for $C_{27}H_{39}N_4Cl_3O_2S$ (molecular weight 590.05): C, 54.96%; H, 6.66%; N, 9.50%. Found: C, 54.76%; H, 6.68%; N, 9.35%.

Example 6

A mixture of 3.9 grams of 10-(3-chloropropyl)phenothiazine, 3 grams of 4-piperidino-4-carbamoylpiperidine, 3 grams of potassium carbonate and 60 milliliters of alcohol is heated under reflux for 4 hours. After the reaction, the precipitate melting at 167° C. is collected by filtration, dissolved in alcohol and treated with alcoholic hydrogen chloride to yield crystalline dihydrochloride of 10-{3-(4-piperidino - 4-carbamoylpiperidino) propyl}phenothiazine, which carries one molecule of water of crystallization and, after recrystallization from aqueous alcohol, melts with decomposition at 256° C.

*Elementary analysis.*—Calculated for $C_{26}H_{32}N_4Cl_2O_2S$ (molecular weight 531.08): C, 58.80%; H, 7.21%; N, 10.55%. Found: C, 58.40%; H, 7.36%; N, 10.49%.

Example 7

A mixture of 5.5 grams of 3-trifluoromethyl-10-(3-bromopropyl)phenothiazine, 3 grams of 4-piperidino-4-carbamoylpiperidine, 3 grams of sodium carbonate and 70 milliliters of alcohol is heated under reflux for 40 hours. After cooling, the precipitate melting at 171° C. is collected by filtration, dissolved in aqueous alcohol and treated with alcoholic hydrogen chloride to yield crystalline dihydrochloride of 3 - trifluoromethyl - 10-{3-(4-piperidino - 4-carbamoylpiperdino)propyl}phenothiazine, which carries ½ molecule of water of crystallization and, after recrystallization from aqeuous alcohol, melts with decomposition at 256–257° C.

*Elementary analysis.*—Calculated for

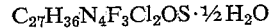
$C_{27}H_{36}N_4F_3Cl_2OS \cdot \tfrac{1}{2}H_2O$ (molecular weight 601.58): C, 53.90%; H, 6.20%; N, 9.31%. Found: C, 53.93%; H, 6.21%; N, 9.10%.

Example 8

A mixture of 4.35 grams of 3-methoxy-10-(3-chloropropyl)phenothiazine, 3 grams of 4-piperidino-4-carbamoylpiperidine, 3 grams of sodium carbonate and 60 milliliters of alcohol is heated under reflux for 40 hours. After the reaction, insoluble substance is filtered off, and to the filtrate alcoholic hydrogen chloride is added to yield crystalline dihydrochloride of 3-methoxy-10-{3-(4-piperidino - 4 - carbamoylpiperidino)propyl}phenothiazine, which melts with decomposition at 252° C.

*Elementary analysis.*—Calculated for $C_{27}H_{38}N_4Cl_2OS$ (molecular weight 553.58): C, 58.58%; H, 6.92%; N, 10.12%. Found: C, 58.14%; H, 7.18%; N, 10.10%.

Example 9

A mixture of 4.6 grams of 3-methoxy-10-(3-methanesulfonyloxy-2-methylpropyl)phenothiazine, 2.1 grams of 4-dimethylamino-4-carbamoylpiperidine, 5 grams of potassium carbonate and 70 milliliters of alcohol is heated under reflux for 40 hours. Then the hot mixture is filtered to remove insoluble substance. After cooling, crystalline product precipitates. The product is collected by filtration, dissolved in alcohol, treated with alcoholic hydrogen chloride, and to the solution is added ether to precipitate a hydrochloride. The precipitate is collected by filtration, dissolved in methanol, and to the solution is added ether to precipitate a purified product. Thus is obtained crystalline dihydrochloride of 3-methoxy-10-{3-(4 - dimethylamino - 4 - carbamoylpiperidino)-2-methylpropyl}phenothiazine, which carries ½ molecule of water of crystallization and melts with foaming at 210° C.

*Elementary analysis.*—Calculated for $$C_{25}H_{36}N_4Cl_2O_2S \cdot \tfrac{1}{2}H_2O$$

(molecular weight 536.56): C, 55.96%; H, 6.95%; N, 10.44%. Found: C, 56.02%; H, 7.37%; N, 10.19%.

Example 10

A mixture of 5 grams of 3-methylthio-10-(3-chloropropyl)phenothiazine, 3 grams of 4-carbamoyl-4-piperidinopiperidine, 6 grams of sodium carbonate and 70 milliliters of alcohol is heated under reflux for 40 hours. After cooling, the mixture is filtered and concentrated. The oily residue is dissolved in 30 milliliters of benzene and extracted with 50 milliliters of 10% hydrochloric acid. Crystalline product precipitated from the aqueous layer is collected by filtration and recrystallized from aqueous alcohol to obtain crystalline dihydrochloride of 3 - methylthio - 10 - {3-(4-carbamoyl-4-piperidinopiperidino)propyl}phenothiazine, which carries one molecule of ethanol and ½ molecule of water of crystallization and melts with foaming at 247° C.

*Elementary analysis.*—Calculated for $$C_{27}H_{36}N_4Cl_2OS_2 \cdot C_2H_5OH \cdot \tfrac{1}{2}H_2O$$

(molecular weight 624.72): C, 55.75%; H, 7.26%; N, 8.97%. Found: C, 55.82%; H, 7.07%; N, 8.86%.

Example 11

Proceeding in the same manner as in Example 10, but employing 3-methyl-10-(3-chloropropyl)phenothiazine instead of 3 - methyl-10-(3-chloropropyl)phenothiazine, there is obtained 5.5 grams of crystalline dihydrochloride of 3-methyl-10-{3-(4-carbamoyl-4-piperidinopiperidino)propyl}phenothiazine, which carries one molecule of ethanol and ½ molecule of water of crystallization and melts with foaming at 248° C.

*Elementary analysis.*—Calculated for $$C_{27}H_{36}N_4Cl_2OS \cdot C_2H_5OH \cdot \tfrac{1}{2}H_2O$$

(molecular weight 592.66): C, 58.77%; H, 7.65%; N, 9.45%. Found: C, 58.65%; H, 7.59%; N, 9.71%.

Example 12

Proceeding in the same manner as in Example 10, but employing 3-acetyl-10-(3-chloropropyl)phenothiazine instead of 3-methylthio-10-(3-chloropropyl)phenothiazine, there is obtained 4.9 grams of crystalline dihydrochloride of 3 - acetyl-10-{3-(4-carbamoyl-4-piperidinopiperidino)propyl}phenothiazine, which carries one molecule of ethanol and ½ molecule of water of crystallization and melts with foaming at 247° C.

*Elementary analysis.*—Calculated for $$C_{28}H_{38}N_4Cl_2O_2S \cdot C_2H_5OH \cdot \tfrac{1}{2}H_2O$$

(molecular weight 620.67): C, 58.05%; H, 7.31%; N, 9.03%. Found: C, 58.15%; H, 7.45%; N, 8.76%.

Example 13

A mixture of 3 grams of 4-cyano-4-phenylpiperidine, 7 grams of 3-chloro-10-(3-bromopropyl)phenothiazine, 5 grams of potassium carbonate and 50 milliliters of benzene is heated under reflux for 40 hours. The reaction mixture is filtered, 50 milliliters of benzene is added to the filtrate, the benzene solution is washed with 10% hydrochloric acid, dried over potassium carbonate, and benzene is distilled off. The oily residue is dissolved in ether, and hydrogen chloride gas is passed through the solution to yield a precipitate. After recrystallization of the precipitate from alcohol, there is obtained crystalline hydrochloride of 3-chloro-10-{3-(4-cyano-4-phenylpiperidino)propyl}phenothiazine, which carries one molecule of alcohol of crystallization and melts with decomposition at 120° C.

Example 14

A mixture of 3 grams of 4-acetamidomethyl-4-phenylpiperidine, 6 grams of 3-chloro-10-(3-bromopropyl)phenothiazine, 5 grams of potassium carbonate and 70 milliliters of benzene is heated under reflux for 40 hours. The reaction mixture is filtered and extracted with 10% hydrochloric acid. The aqueous layer is neutralized with 10% sodium hydroxide and shaken with benzene. The benzene layer is separated, benzene distilled off, and the oily residue treated with hydrogen chloride in ether to form hydrochloride of 3 - chloro - 10-{3-(4-acetamidomethyl - 4-phenylpiperidino)propyl}phenothiazine, which melts with decomposition at 137–140° C.

Example 15

(a) 10 grams of 3-chlorophenothiazine is subjected to reaction with sodium amide, prepared from 1.1 grams of metallic sodium, in liquid ammonia. Then ammonia is replaced by xylene, and to the xylene solution is added 11 grams of N-(3-chloropropyl)-4-cyano-4-phenylpiperidine at 130–140° C. in the course of 1 hour. Then the mixture is maintained at the same temperature for further 1 hour. After cooling, the reaction mixture is filtered, washed with water, dried over potassium carbonate, and xylene is distilled off. The remaining oily residue is dissolved in ether, and hydrogen chloride gas is passed through the solution. The precipitate formed is collected and recrystallized from alcohol to obtain hydrochloride of 3-chloro-10-{3-(4-cyano-4-phenylpiperidino)propyl}-phenothiazine, which carries one molecule of alcohol of crystallization and melts with decomposition at 120° C.

(b) A mixture of 5 grams of thus obtained hydrochloride of 3-chloro-10-{3-(4-cyano-4-phenylpiperidino)propyl}phenothiazine, 50 milliliters of alcohol, 2 grams of Raney nickel and 1 gram of anhydrous sodium acetate is heated at 50–70° C. for 2 hours in an autoclave at an initial hydrogen pressure of 50 atmospheres. From the mixture, Raney nickel is filtered off, and alcohol distilled off. The oily residue is dissolved in benzene, washed with water, dried over sodium sulfate, chromatographed over 100 grams of alumina, and treated with hydrogen chloride in ether to yield crystalline hydrochloride of 3 - chloro-10-{3-(4-acetamidomethyl-4-phenylpiperidino)-propyl}phenothiazine, which melts at 137–140° C.

Example 16

Proceeding in the same manner as in Example 15(a), but employing N-(3-chloropropyl)-4-acetamidomethyl-4-phenylpiperidine instead of N-(3-chloropropyl)-4-cyano-4-phenylpiperidine, there is obtained crystalline hydrochloride of 3-chloro-10-{3-(4-acetamidomethyl-4-phenylpiperidino)propyl}phenothiazine, which melts at 137–140° C.

Example 17

Starting with a mixture of 4 grams of 3-chloro-10-(3-bromopropyl)phenothiazine, 3 grams of 4-(3-chlorophenyl)-4-pyrrolidinamidopiperidine, 3 grams of potassium carbonate, 0.2 gram of copper powder and 60 milliliters of benzene, and proceeding as in Example 14, there is obtained crystalline hydrochloride of 3-chloro-10 - [3-{4-(3-chlorophenyl)-4-pyrrolidinamidopiperidino} propyl]phenothiazine, which carries one molecule of water of crystallization and melts with foaming at about 120° C.

*Elementary analysis.*—Calculated for $C_{31}H_{36}N_3Cl_3O_2S$ (molecular weight 621.06): C, 59.95%; H, 5.84%; N, 6.77%. Found: C, 60.37%; H, 5.82%; N, 6.61%.

*Example 18*

Starting from the same mixture as in Example 17, but replacing 4 - (3 - chlorophenyl)-4-pyrrolidinamidopiperidine by 4-(4-chlorophenyl)-4-hydroxypiperidine, and proceeding as in Example 14, there is obtained hydrochloride of 3-chloro-10-[3-{4-(4-chlorophenyl)-4-hydroxypiperidino}propyl]phenothiazine, which, after recrystallization from methanol-ether, melts at 196° C.

*Elementary analysis.*—Calculated for $C_{26}H_{27}N_2Cl_3O$ (molecular weight 521.94): C, 59.83%; H, 5.22%; N, 5.37%. Found: C, 59.63%; H, 5.07%; N, 5.43%.

*Example 19*

Starting from the same mixture as in Example 17, but replacing 4 - (3 - chlorophenyl)-4-pyrrolidinamidopiperidine by 4-phenyl-4-hydroxypiperidine, and proceeding as in Example 14, there is obtained crystalline hydrochloride of 3 - chloro-10-{3-(4-phenyl-4-hydroxypiperidino)propyl}phenothiazine, which melts at about 115° C.

*Elementary analysis.*—Calculated for $C_{26}H_{28}N_2Cl_2OS$ (molecular weight 487.48): C, 64.06%; H, 5.79%; N, 5.75%. Found: C, 64.15%; H, 5.89%; N, 5.59%.

*Example 20*

Starting with the same mixture as in Example 17, but replacing 4 - (3 - chlorophenyl) - 4 - pyrrolidinamidopiperidine by 4-(4-methylphenyl)-4-hydroxypiperidine, and proceeding as in Example 14, there is obtained crystalline hydrochloride of 3-chloro-10-[3-{4-(4-methylphenyl) - 4 - hydroxypiperidino}propyl]phenothiazine, which melts at 185° C.

*Elementary analysis.*—Calculated for $C_{27}H_{30}N_2Cl_2OS$ (molecular weight 485.51): C, 66.79%; H, 6.23%; N, 5.77%. Found: C, 66.81%; H, 6.03%; N, 5.73%.

*Example 21*

A mixture of 4.9 grams of 3-methoxy-10-(3-methanesulfonyloxy-3-methylpropyl)phenothiazine, 3 grams of 4-phenyl-4-acetamidomethylpiperidine, 5 grams of sodium carbonate and 70 milliliters of alcohol is heated under reflux for 40 hours. After cooling, the reaction mixture is filtered and concentrated. The viscous liquid is thoroughly mixed with 50 milliliters of 5% hydrochloric acid, and the mixture is shaken with 50 milliliters of methylene chloride. The methylene chloride layer is neutralized with potassium carbonate solution and dried over potassium carbonate. Methylene chloride is distilled off, the oily residue is dissolved in ether and treated with hydrogen chloride. There is obtained as white powder 3-methoxy - 10-{3-(4-phenyl-4-aminomethylpiperidino)-2-methylpropyl}phenothiazine hydrochloride monohydrate, which melts with foaming at 135° C.

*Elementary analysis.*—Calculated for $$C_{31}H_{38}N_3ClO_2S \cdot H_2O$$

(molecular weight 570.18): C, 65.30%; H, 7.07%; N, 7.37%. Found: C, 65.38%; H, 7.26%; N, 7.35%.

*Example 22*

A mixture of 5.4 grams of 3-methoxy-10-(3-methanesulfonyloxy-2-methylpropyl)phenothiazine, 3 grams of 4-(4 - chlorophenyl) - 4 - hydroxypiperidine, 6 grams of sodium carbonate and 70 milliliters of alcohol is heated under reflux for 40 hours. After cooling, the reaction mixture is filtered and concentrated. The oily residue is mixed with 50 milliliters of 5% hydrochloric acid and taken up into methylene chloride. The methylene chloride solution is neutralized with potassium carbonate solution, dried over potassium carbonate, and methylene chloride is distilled off. The residue is dissolved in ether and hydrogen chloride is passed through the solution to yield a crystalline precipitate, which is collected and dried. Thus is obtained hydrochloride of 3-methoxy-10 - [3 - {4 - (4 - chlorophenyl)-4-hydroxypiperidino}-2-methylpropyl]phenothiazine, which carries ½ molecule of water of crystallization and melts with foaming at 150–160° C.

*Elementary analysis.*—Calculated for $$C_{28}H_{32}N_2Cl_2O_2S \cdot \tfrac{1}{2}H_2O$$

(molecular weight 540.54): C, 62.21%; H, 6.16%; N, 5.19%. Found: C, 62.15%; H, 6.18%; N, 5.25%.

*Example 23*

A mixture of 4.2 grams of 3-chloro-10-(3-chloropropyl)phenothiazine, 3 grams of 4-methoxy-4-phenylpiperidine, 6 grams of sodium carbonate and 70 milliliters of alcohol is heated under reflux for 40 hours. After cooling, the reaction mixture is filtered, and alcohol is distilled off. The oily residue is dissolved in 30 milliliters of benzene, chromatographed over 100 grams of alumina, and eluted with benzene. Each fraction of the eluate is subjected to Dragendorff test and basic fractions are collected. Thus collected benzene solution is concentrated, dissolved in ether, and hydrogen chloride is passed through the solution to yield a precipitate, which is collected and dried. Thus is obtained powdery hydrochloride of 3 - chloro - 10-{3-(4-methoxy-4-phenylpiperidino)propyl}phenothiazine, which melts at 90–100° C.

*Example 24*

3-chloro-10-(3-chloropropyl)phenothiazine and 4-hydroxy - 4 - (3-trifluoromethylphenyl)-piperidine are subjected to condensation reaction by proceeding as in Example 23, there is obtained powdery hydrochloride of 3 - chloro - 10 - [3 - {4-hydroxy-4-(3-trifluoromethylphenyl)piperidino}propyl]phenothiazine, which melts at 110–120° C.

*Example 25*

6 grams of 3 - trifluoromethyl - 10-(3-bromopropyl)-phenothiazine and 3 grams of 4-hydroxy-4-phenylpiperidine are subjected to condensation reaction by proceeding as in Example 22, there is obtained 5.2 grams of crystalline hydrochloride of 3-trifluoromethyl-10-{3-(4-hydroxy-4-phenylpiperidino)propyl}phenothiazine, which melts at 75–85° C.

*Example 26*

A mixture of 5.3 grams of 3 - chloro-10-(3-chloropropyl)phenothiazine, 3.2 grams of 4 - phenyl - 4 - carbamoylpiperidine, 6 grams of sodium carbonate and 70 milliliters of alcohol is heated under reflux for 40 hours. After cooling, the reaction mixture is filtered and concentrated. The oily residue is dissolved in 30 milliliters of benzene and extracted with 50 milliliters of 10% hydrochloric acid. The oily substance which separates out in the aqueous layer is extracted with 50 milliliters of methylene chloride. The methylene chloride layer is washed with potassium carbonate solution, dried over potassium carbonate, and methylene chloride is distilled off. The residue is dissolved in ether, hydrogen chloride is passed through the solution to yield a crystalline product, which is collected by filtration. There is obtained powdery 3-chloro-10-{3-(4-phenyl-4-carbamoylpiperidino)propyl}phenothiazine hydrochloride monohydrate, which melts with foaming at 104–110° C.

*Elementary analysis.*—Calculated for $$C_{27}H_{29}N_3Cl_2SO \cdot H_2O$$

(molecular weight 532.4): C, 60.43%; H, 5.82%; N, 7.83%. Found: C, 60.52%; H, 6.11%; N, 7.76%.

Example 27

5 grams of 3-methyl-10-(3-chloropropyl)phenothiazine and 2.5 grams of 4-phenyl-4-cyanopiperidine are subjected to condensation reaction by proceeding as in Example 26, there is obtained crystalline hydrochloride of 3-methylthio-10-{3-(4-phenyl-4-cyanopiperidino)propyl}phenothiazine, which melts with foaming at 110° C.

Example 28

3-methylthio-10-(3-chloropropyl)phenothiazine and 4-phenyl-4-cyanopiperidine are subjected to condensation reaction by proceeding as in Example 26, there is obtained crystalline hydrochloride of 3-methylthio-10-{3-(4-phenyl-4-cyanopiperidino)propyl}phenothiazine, which melts with foaming at 110° C.

Example 29

3-acetyl-10-(3-chloropropyl)phenothiazine and 4-phenyl-4-cyanopiperidine are subjected to condensation reaction by proceeding as in Example 26, there is obtained crystalline hydrochloride of 3-acetyl-10-{3-(4-phenyl-4-cyanopiperidino)propyl}phenothiazine, which melts with foaming at 106° C.

Example 30

10-(3-chloropropyl)phenothiazine and 4-phenyl-4-cyanopiperidine are subjected to condensation reaction by proceeding as in Example 26, there is obtained crystalline hydrochloride of 10-{3-(4-phenyl-4-cyanopiperidino)propyl}phenothiazine, which melts with foaming at 100° C.

What we claim is:

1. 3-chloro-10-{3-(4-pyrrolidinopiperidino)propyl}phenothiazine.
2. 3-chloro-10-{3-(4-piperidinopiperidino)propyl}phenothiazine.
3. 3-chloro-10-{3-(4-piperidino-4-carbamoylpiperidino)propyl}phenothiazine.
4. 10-{3-(4-piperidino-4-carbamoylpiperidino)propyl}phenothiazine.
5. 3-trifluoromethyl-10-{3-(4-piperidino-4-carbamoylpiperidino)propyl}phenothiazine.
6. 3-methoxy-10-{3-(4-piperidino-4-carbamoylpiperidino)propyl}phenothiazine.
7. 3-methoxy-10-{3-(4-dimethylamino-4-carbamoylpiperidino)-2-methylpropyl}phenothiazine.
8. 3-methylthio-10-{3-(4-carbamoyl-4-piperidinopiperidino)propyl}phenothiazine.
9. 3-methyl-10-{3-(4-carbamoyl-4-piperidinopiperidino)propyl}phenothiazine.
10. 3-acetyl-10-{3-(4-carbamoyl-4-piperidinopiperidino)propyl}phenothiazine.
11. 3-chloro-10-{3-(4-cyano-4-phenylpiperidino)propyl}phenothiazine.
12. 3-chloro-10-{3-(4-acetamidomethyl-4-phenylpiperidino)propyl}phenothiazine.
13. 3-chloro-10-[3-{4-(3-chlorophenyl)-4-N,N-tetramethylenecarbamoylpiperidino}propyl]phenothiazine.
14. 3-chloro-10-[3-{4-(4-chlorophenyl)-4-hydroxypiperidino}propyl]phenothiazine.
15. 3-methoxy-10-{3-(4-phenyl-4-aminomethylpiperidino)-2-methylpropyl}phenothiazine.
16. 3-methoxy-10-[3-{4-(4-chlorophenyl)-4-hydroxypiperidino}-2-methylpropyl]phenothiazine.
17. 3-chloro-10-{3-(4-methoxy-4-phenylpiperidino)propyl}phenothiazine.
18. 3-chloro-10-[3-{4-hydroxy-4-(3-trifluoromethylphenyl)piperidino}propyl]phenothiazine.
19. 3-chloro-10-{3-(4-phenyl-4-carbamoylpiperidino)propyl}phenothiazine.
20. 3-methylthio-10-{3-(4-phenyl-4-cyanopiperidino)propyl}phenothiazine.
21. 3-acetyl-10-{3-(4-phenyl-4-cyanopiperidino)propyl}phenothiazine.
22. 10-{3-(4-phenyl-4-cyanopiperidino)propyl}phenothiazine.

References Cited by the Examiner

UNITED STATES PATENTS

| | | | |
|---|---|---|---|
| 3,063,996 | 11/1962 | Gordon | 260—243 |
| 3,112,308 | 11/1963 | Lowrie | 260—243 |

FOREIGN PATENTS

35/8,322   7/1960   Japan.

JOHN D. RANDOLPH, *Primary Examiner.*

WALTER A. MODANCE, *Examiner.*

HARRY I. MOATZ, *Assistant Examiner.*